US012720604B2

(12) United States Patent
Ohara et al.

(10) Patent No.: US 12,720,604 B2
(45) Date of Patent: Aug. 25, 2026

(54) TERMINAL, RADIO COMMUNICATION METHOD, AND BASE STATION

(71) Applicant: NTT DOCOMO, INC., Tokyo (JP)

(72) Inventors: Tomoya Ohara, Tokyo (JP); Masaya Okamura, Tokyo (JP); Hiroki Harada, Tokyo (JP); Daisuke Kurita, Tokyo (JP); Mayuko Okano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 361 days.

(21) Appl. No.: 18/554,114

(22) PCT Filed: Apr. 9, 2021

(86) PCT No.: PCT/JP2021/015065
§ 371 (c)(1),
(2) Date: Oct. 5, 2023

(87) PCT Pub. No.: WO2022/215264
PCT Pub. Date: Oct. 13, 2022

(65) Prior Publication Data
US 2024/0205981 A1 Jun. 20, 2024

(51) Int. Cl.
*H04W 74/0833* (2024.01)
*H04W 56/00* (2009.01)

(52) U.S. Cl.
CPC ..... *H04W 74/0833* (2013.01); *H04W 56/001* (2013.01)

(58) Field of Classification Search
CPC ........... H04W 74/0833; H04W 56/001; H04W 56/0015
See application file for complete search history.

(56) References Cited

U.S. PATENT DOCUMENTS

2018/0338308 A1* 11/2018 Park ...................... H04L 5/0053
2020/0170044 A1 5/2020 Kim et al.
2021/0014694 A1 1/2021 Li et al.
(Continued)

FOREIGN PATENT DOCUMENTS

EP 3624539 A1 3/2020
JP 2022541756 A 9/2022
WO 2020213977 A1 10/2020

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Kyaw Z Soe
(74) *Attorney, Agent, or Firm* — Osha Bergman Watanabe & Burton LLP

(57) ABSTRACT

A terminal according to an aspect of the present disclosure includes: a control section that determines, based on at least one of terminal identification information, a terminal type, terminal capability information, and information notified from a base station, at least one of a transmission occasion and an index that are available for transmission of a random access preamble; and a transmitting section that transmits the random access preamble.

5 Claims, 10 Drawing Sheets

(56) References Cited

U.S. PATENT DOCUMENTS

2021/0051708 A1* 2/2021 Agiwal ............. H04W 74/0833

OTHER PUBLICATIONS

3GPP TSG-RAN WG1#NR3; R1-1716138 "Remaining details on PRACH procedure" Nokia, Nokia Shanghai Bell; Nagoya, Japan; Sep. 18-21, 2017 (6 pages).

3GPP TSG RAN WG1 #104-e; R1-2101549 "Type A PUCH repetitions for Msg3" Sharp; e-Meeting; Jan. 25-Feb. 5, 2021 (3 pages).

International Search Report issued in International Application No. PCT/JP2021/015065, mailed Nov. 22, 2021 (5 pages).

Written Opinion issued in International Application No. PCT/JP2021/015065; Dated Nov. 22, 2021 (4 pages).

Office Action issued in Japanese Patent Application No. 2023-512636, dated Jul. 8, 2025 (6 pages).

Office Action issued in Japanese Application No. 2023-512636, mailed Mar. 18, 2025 (8 pages).

Extended European Search Report issued in Application No. 21936067.4, mailed Dec. 17, 2024 (8 pages).

* cited by examiner

UE
BASE STATION
TIME
SS/PBCH block (SSB)
RMSI
MESSAGE A
MESSAGE 1
+
MESSAGE 3
MESSAGE B
MESSAGE 2
+
MESSAGE 4
RRC CONNECTION UE
BASE STATION
TIME
SS/PBCH block (SSB)
RMSI
MESSAGE 1 (PRACH)
MESSAGE 2 (RAR)
MESSAGE 3
MESSAGE 4
RRC CONNECTION PRACH FORMAT FOR SHORT SEQUENCE
FREQUENCY
TIME
2.16 MHz
FORMAT A1
FORMAT A2
FORMAT A3
FORMAT B1
FORMAT B2
FORMAT B3
FORMAT B4
FORMAT C0
FORMAT C2
RACH OFDM SYMBOL
GP
CP
1 ms

SSB#0
SSB#1
SSB#2
SSB#3
SSB#4
SSB#5
SSB#6
SSB#7

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

In an existing LTE system (for example, 3GPP Rel. 8 to Rel. 14), a user terminal (User Equipment (UE)) transmits uplink control information (UCI) by using at least one of a UL data channel (for example, Physical Uplink Shared Channel (PUSCH)) and a UL control channel (for example, Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For the future radio communication systems (for example, Rel. 17 or later versions, Beyond5G/6G or later generations), the number of terminals per cell is expected to increase with wider variety of use cases. Alternatively, in order to support communication control using a high frequency band, the number of given signals (for example, synchronization signals and/or the like) is expected to increase.

Such an increase in the number of terminals/synchronization signals (for example, SSBs) may cause an increase in contention (for example, contention of PRACH) for a case of performing a random access procedure. The increase in contention in a random access procedure may cause deterioration of the communication quality.

In view of this, the present disclosure has one object to provide a terminal, a radio communication method, and a base station that enable appropriate control of an initial access or a random access procedure even when the number of terminals/given signals increases.

Solution to Problem

A terminal according to an aspect of the present disclosure includes: a control section that determines, based on at least one of terminal identification information, a terminal type, terminal capability information, and information notified from a base station, at least one of a transmission occasion and an index that are available for transmission of a random access preamble; and a transmitting section that transmits the random access preamble.

Advantageous Effects of Invention

According to an aspect of the present disclosure, an initial access or a random access procedure can be appropriately controlled even when the number of terminals/given signals increases.

DESCRIPTION OF EMBODIMENTS (Initial Access/Random Access Procedure)

In an existing system (for example, Rel. 16 or earlier versions), a random access procedure to establish UL synchronization is supported. The random access procedure includes contention-based random access (also referred to as CBRA or the like) and non-contention-based random access (also referred to as Non-CBRA, contention-free random access (CFRA), or the like).

In the contention-based random access (CBRA), a UE transmits a preamble randomly selected from a plurality of preambles (also referred to as random access preambles, random access channels (Physical Random Access Channels (PRACHs)), RACH preambles, or the like) defined for each cell. The contention-based random access is a UE-initiated random access procedure, and can be used, for example, in an initial access, in start or resumption of a UL transmission, and the like.

On the other hand, in the non-contention-based random access (Non-CBRA, CFRA), a network (for example, base station) allocates a preamble in a UE-specific manner by using a downlink (DL) control channel (Physical Downlink Control Channel (PDCCH)), and the UE transmits the preamble allocated by the network. The non-contention-based random access is a network-initiated random access procedure, and can be used, for example, in a handover, in start or resumption of a DL transmission (in start or resumption of transmission, in a UL, of retransmission indication information for the DL), and the like.

In NR, the CBRA includes 4-step CBRA procedure prescribed in Rel. 15 and 2-step CBRA procedure prescribed in Rel. 16. The former may be referred to as a 4-step RACH or the like, and the latter may be referred to as a 2-step RACH or the like.

Figure 1B:
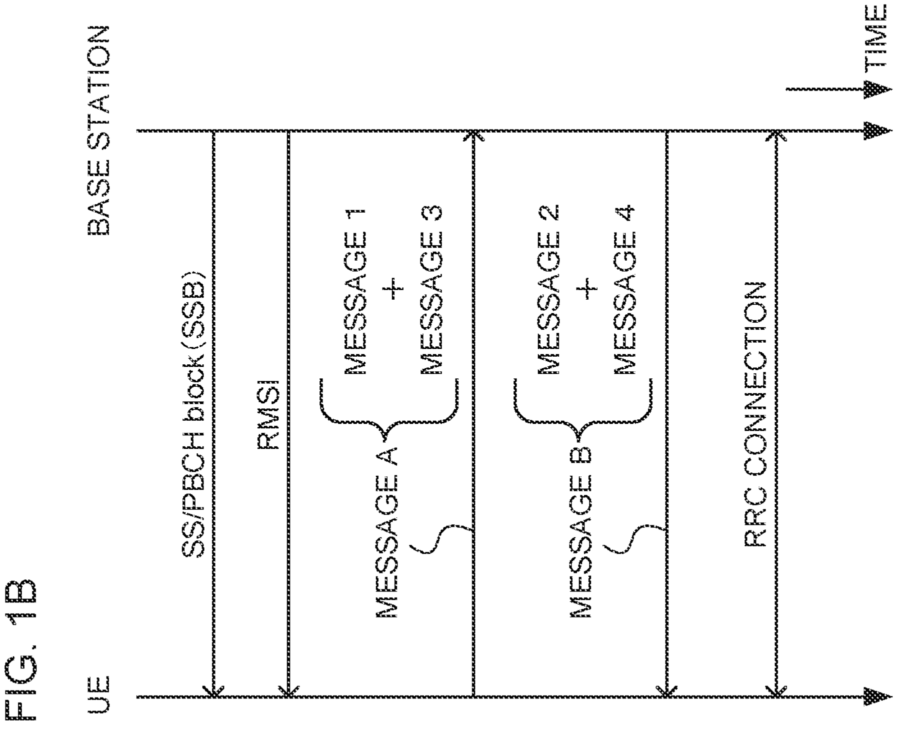
FIGS. 1A and 1B are each a diagram to illustrate an example of an initial access procedure/random access procedure.
Figure 1A:
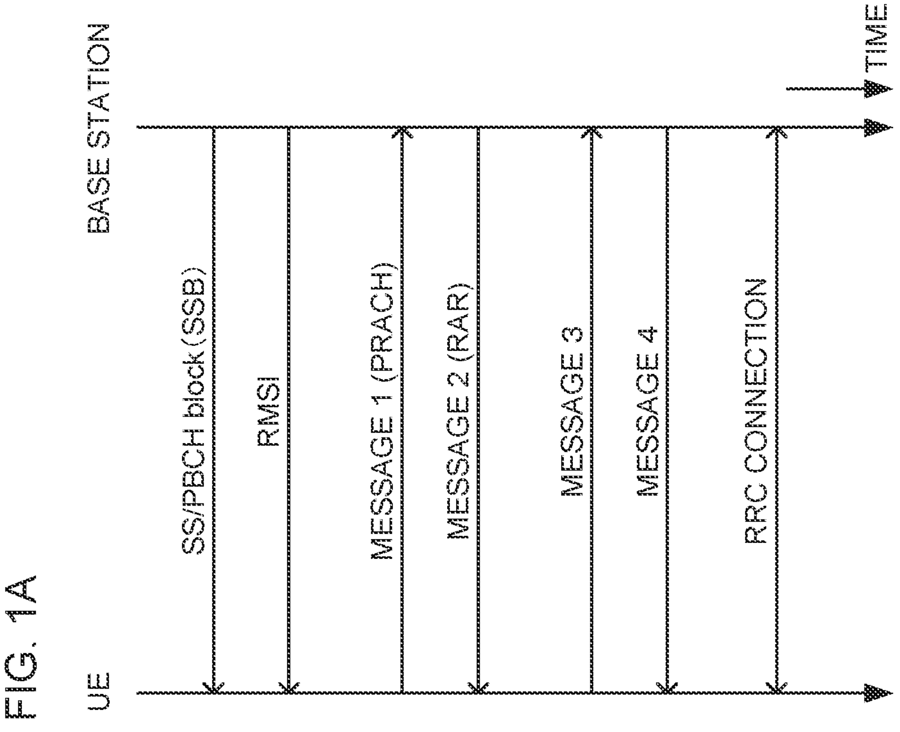

FIGS. 1A and 1B are each a diagram to illustrate an example of an initial access procedure. A UE, first, receives information (random access channel (PRACH) configuration information) indicating a configuration of a PRACH (PRACH configuration, RACH configuration) in advance, through at least one of system information (for example, MIB (Mater Information Block), SIB (System Information Block)) and higher layer signaling (for example, RRC (Radio Resource Control) signaling).

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the example of FIG. 1A, the UE first receives PRACH configuration information in a synchronization signal block (SSB) and minimum system information (Remaining Minimum System Information (RMSI)). The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

For example, the PRACH configuration information may include a plurality of physical cell IDs (PCIs) defined for respective cells, a plurality of preambles (for example, preamble formats) defined for respective cells, a time resource (for example, system frame number, subframe number) to be used for the PRACH transmission and a frequency resource (for example, an offset (prach-FrequencyOffset) indicating a starting position of six resource blocks (Physical Resource Blocks (PRBs))), and the like.

A monitoring position for a PDCCH may be notified on a PBCH, a resource for RMSI (RMSI PDSCH) may be notified on the PDCCH, and a resource and the like to be used for a PRACH may be notified in the RMSI.

As illustrated in FIG. 1A, in a case where the UE transitions from an idle (RRC_IDLE) state to an RRC connected (RRC_CONNECTED) state (for example, in an initial access), when the UE is in the RRC connected state but without any UL synchronization established (for example, at the time of start or resumption of a UL transmission) and/or the like, the UE randomly selects one from the plurality of preambles indicated in the PRACH configuration information and transmits the selected preamble on a PRACH (Message 1).

The PRACH may be transmitted on a given transmission occasion. The given transmission occasion may be referred to as a PRACH transmission opportunity, a PRACH occasion, or a PRACH transmission occasion. A plurality of PRACH transmission occasions may be configured different from each other in time domain, or configured different from each other in at least one of frequency domain and time domain. The PRACH may be interpreted as an RACH.

A synchronization signal block may be associated with a PRACH transmission occasion. For example, one or more synchronization signal blocks may be associated with one PRACH transmission occasion, or one or more PRACH transmission occasions may be associated with one synchronization signal block.

A base station detecting a preamble transmits, in response to the preamble, a random access response (RAR) (Message 2). When the UE, after transmitting a preamble, fails to receive the PAR within a given period (RAR window), the UE transmits (retransmits or re-transmits) the preamble again with the increased transmit power of the PRACH. Note that increasing the transmit power in the retransmission is also referred to as power ramping.

The UE receiving the RAR adjusts the transmission timing of a UL on the basis of a timing advance (TA) included in the RAR to establish the UL synchronization. The UE transmits, by using a UL resource specified by a UL grant included in the RAR, a control message for a higher layer (Layer 2/Layer 3 (L2/L3)) (Message 3). The control message includes an identifier of UE (UE-ID). The identifier of UE may be, for example, a C-RNTI (Cell-Radio Network Temporary Identifier) for the RRC connected state, or a UE-ID of a higher layer such as an S-TMSI (System Architecture Evolution-Temporary Mobile Subscriber Identity) for the idle state.

The base station transmits, in response to the control message for the higher layer, a contention resolution message (Message 4). The contention resolution message is transmitted based on addressing to an identifier of user terminal included in the control message. The user terminal having succeeded in detecting the contention resolution message transmits an acknowledgement (Acknowledge (ACK)) in an HARQ (Hybrid Automatic Repeat reQuest) to the network. Thus, the UE in the idle state transitions to the RRC connected state.

On the other hand, the UE having failed in detecting the contention resolution message determines a contention occurred, reselects a preamble, and repeats the random access procedure of Message 1 to Message 4. With the ACK from the user terminal, when the radio base station detects the contention resolved, the radio base station transmits a UL grant to the UE. The UE starts UL data by using the UL resource allocated by the UL grant.

In the contention-based random access as described above, the UE can start the random access procedure autonomously when desiring transmission of UL data. After the UL synchronization established, the UL data is transmitted by using the UL resource allocated in a manner specific to a user terminal by the UL grant, thus allowing highly reliable UL transmission. Message 1 to Message 4 in the initial access procedure may be referred to as the random access procedure.

In NR Rel. 16, a random access procedure using steps fewer than the existing four steps is under study. One example may be a random access procedure using two steps. The random access procedure using two steps is also referred to as a 2-step random access procedure, two-step RACH, or 2-step RACH.

The 2-step RACH may include a first step of performing transmission from a UE to a network and a second step of performing transmission from the network to the UE (see FIG. 1B).

For example, in the first step, at least one of a UL signal and UL channel including a preamble and message may be transmitted from the UE to the network (base station). The preamble may have a configuration for a role similar to Message 1 (PRACH) in the existing random access procedure. The message may have a configuration for a role similar to Message 3 (PUSCH) in the existing random access procedure. Note that the preamble and message transmitted in the first step may be referred to as Message A (Msg. A) or first message.

In the second step, at least one of a DL signal and DL channel including a response and contention-resolution may be transmitted from the network (base station) to the UE. The response may have a configuration for a role similar to Message 2 (the random access response (RAR) transmitted on the PDSCH) in the existing random access procedure. The contention-resolution may have a configuration for a role similar to Message 4 (PDSCH) in the existing random access procedure. Note that the message transmitted in the second step may be referred to as Message B (Msg. B) or second message.

RMSI may be a PDSCH (RMSI PDSCH) carrying RMSI. Message 2 may be a PDSCH (Message 2 PDSCH) carrying Message 2. Message 3 may be a PUSCH (Message 3 PUSCH) carrying Message 3. Message 4 may be a PDSCH (Message 4 PDSCH) carrying Message 4. The PDSCH carrying RMSI/Message 2/Message 4 may be scheduled through a PDCCH.

(PRACH Preamble)

In an existing system (for example, Rel. 16 or earlier versions), a plurality of PRACH formats (also referred to as PRACH preamble formats, preamble formats, or the like) are supported.

Figure 2:
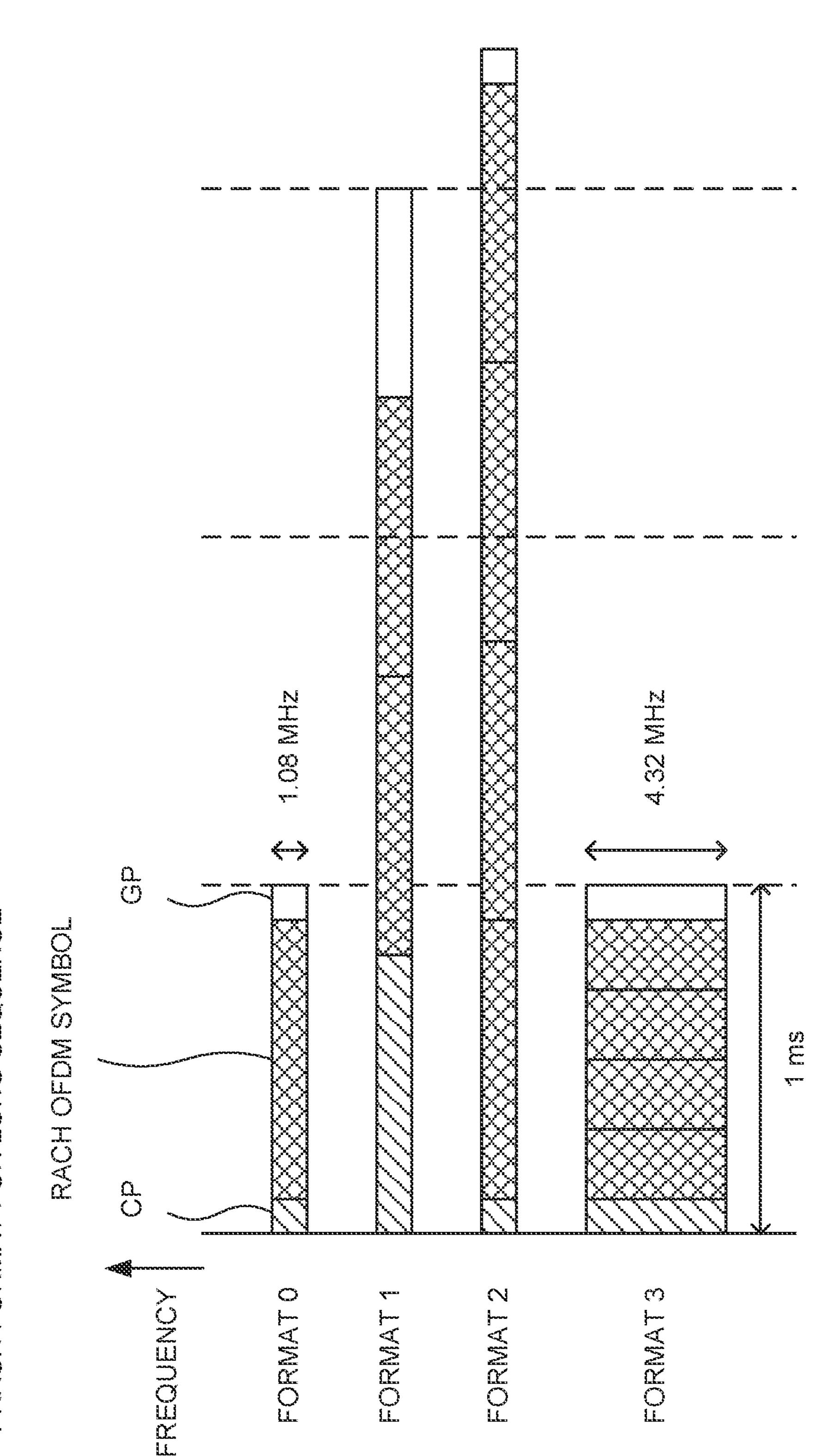
FIG. 2 is a diagram to illustrate an example of PRACH formats for long sequence.
Figure 3:
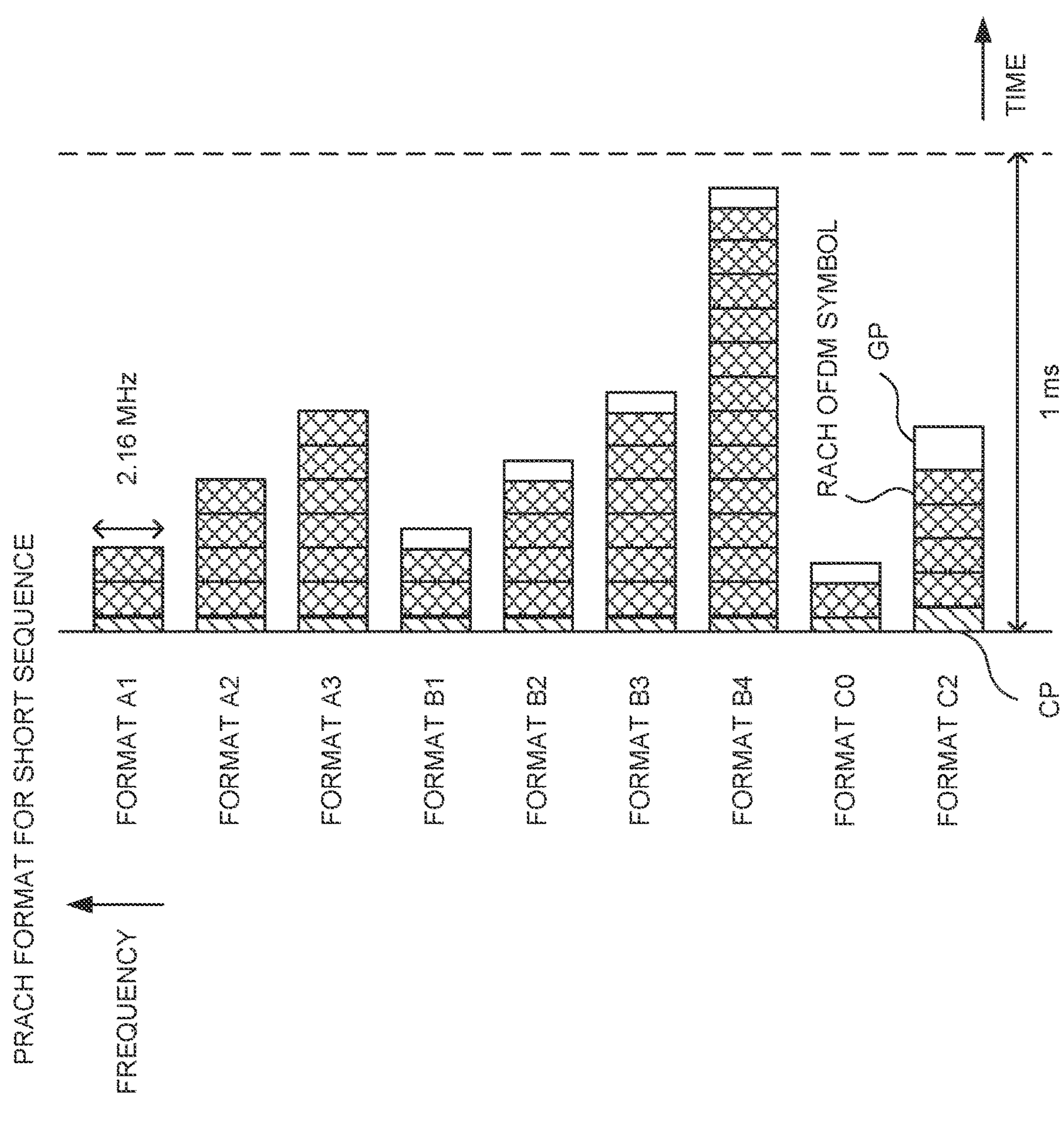
FIG. 3 is a diagram to illustrate an example of PRACH formats for short sequence.

A PRACH preamble using each PRACH format includes a RACH OFDM symbol. Furthermore, the PRACH preamble may include at least one of a cyclic prefix (CP) and a guard period (GP). FIGS. 2 and 3 each illustrate an example of PRACH formats supported by Rel. 15.

For example, PRACH formats 0 to 3 illustrated in FIG. 2 each illustrate a case where a preamble sequence of long sequence (here, a preamble has a sequence length of 839) is used in a RACH OFDM symbol. The preamble sequence may be mapped to a frequency resource (for example, subcarrier) allocated for the PRACH.

PRACH formats A1 to A3, B1 to B4, and C0 and C2 illustrated in FIG. 3 each illustrate a case where a preamble sequence of short sequence (here, a preamble has a sequence length of 139) is used in a RACH OFDM symbol. In Rel. 16, sequence lengths of 571 and 1151 are also supported.

For a PRACH preamble in an existing system (for example, Rel. 16 or earlier versions), a sequence length and a subcarrier spacing are defined in association with each other. For the PRACH formats illustrated in FIG. 2, a subcarrier spacing of 1.25 kHz or 5 kHz corresponds to the preamble sequence length of 839.

For the PRACH formats illustrated in FIG. 3, a subcarrier spacing of 15 kHz ($\mu$=0), 30 kHz ($\mu$=1), 60 kHz ($\mu$=2), or 120 kHz ($\mu$=3) corresponds to the preamble sequence length of 839. A subcarrier spacing of 30 kHz $\mu$=1) corresponds to the preamble sequence length of 571. A subcarrier spacing of 15 kHz ($\mu$=0) corresponds to the preamble sequence length of 1151.

As described above, in an existing system, only several types of sequence lengths are defined as sequence lengths applicable for the PRACH preamble, and a subcarrier spacing (or slot length) configurable for each of the sequence lengths is limited.

For the future radio communication systems (for example, Rel. 17 or later versions, Beyond5G/6G or later generations), further enhancement in communication performance and wider variety of use cases are expected. For example, in the future radio communication systems, in order to support an environment (for example, multi terminal environment) including a number of terminals more than ever, an increase in the number of terminals per cell is conceivable. Communication using a frequency band higher than ever may be supported and thus the number of given signals (for example, synchronization signals and/or the like) may increase.

Such an increase in the number of terminals/synchronization signals (for example, SSBs) may cause an increase in contention (for example, contention of PRACH) for a case of performing a random access procedure. The increase in contention in a random access procedure may cause deterioration of the communication quality.

In view of this, the inventors of the present invention focused on a point that the number of terminals/synchronization signal blocks may increase in the future radio communication systems, studied on an initial access/random access procedure according to the point, and came up with the idea of the present embodiment.

Embodiments according to the present disclosure will be described in detail with reference to the drawings as follows. The radio communication methods according to respective embodiments may each be employed individually, or may be employed in combination. For example, any of the 4-step random access procedure and 2-step random access procedure described above may be combined with any of examples as below for application.

Note that, in the present disclosure, "A/B" may be interpreted as "at least one of A and B", and "A/B/C" may be interpreted as "at least one of A, B, and C".

In the present disclosure, a PDSCH, RMSI, a RMSI PDSCH, Message 2, a Message 2 PDSCH, Message 4, and a Message 4 PDSCH may be interchangeably interpreted. A PUSCH, Message 3, and a Message 3 PUSCH may be interchangeably interpreted. An RACH, a PRACH, Message 1, a random access preamble, and an RACH preamble may be interchangeably interpreted.

In the present disclosure, fixing, limiting, and prescribing may be interchangeably interpreted. In the present disclosure, limiting may mean limiting to a specific value/parameter/range. An initial access, an initial access procedure, a random access, and a random access procedure may be interchangeably interpreted. Prescribing may mean prescribing in a specification. In the present disclosure, a design, a structure, a configuration, a parameter, a value, and a configuration range may be interchangeably interpreted.

First Aspect

In a first aspect, a case will be described in which an occasion (PRACH transmission occasion)/preamble index to be used for transmission of a random access preamble (for example, PRACH preamble) is configured separately per terminal.

UEs may be divided by a unit of PRACH transmission occasion/unit of preamble. For example, for each UE (or UE group), a PRACH transmission occasion/preamble available for a random access procedure (for example, PRACH transmission) may be configured/defined.

For example, it may be configured that a UE #A (or UE group #A) can use a first transmission occasion and a UE #B (or UE group #B) can use a second transmission occasion.

Each of the first transmission occasion/second transmission occasion may include one or more transmission occasions. For example, the first transmission occasion may correspond to transmission occasions having indices of even numbers and the second transmission occasion may correspond to transmission occasions having indices of odd numbers.

Figures 4A, 4B:
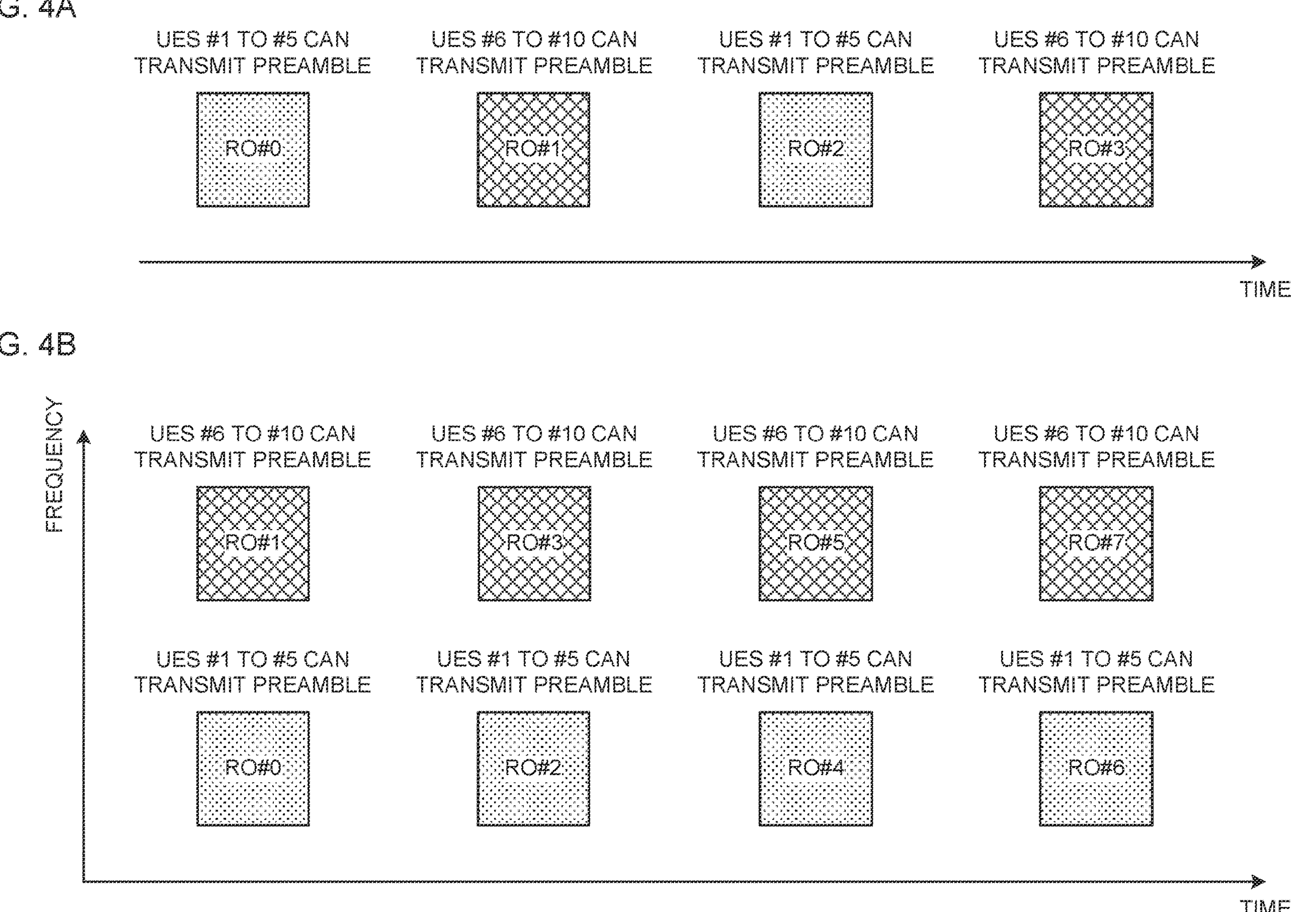
FIGS. 4A and 4B are each a diagram to illustrate an example of transmission occasions to be used for transmission of PRACH preambles according to a first aspect.

FIGS. 4A and 4B each illustrate an example of a case where PRACH transmission occasions available are divided and configured per UE/UE group. FIG. 4A illustrates a case where PRACH transmission occasions are divided in time domain per UE/UE group. A case is illustrated in which UEs #1 to #5 can use (or are limited to) a first transmission occasion (here, RO #0 and RO #2) and UEs #6 to #10 can use (or are limited to) a second transmission occasion (here, RO #1 and RO #3). Here, a case is illustrated in which UEs/UE groups are divided into two, but the UEs/UE groups may be divided into three or more.

FIG. 4B illustrates a case where PRACH transmission occasions are divided in frequency domain per UE/UE group. A case is illustrated in which UEs #1 to #5 can use (or are limited to) a first transmission occasion (here, RO #0, RO #2, RO #4, and RO #6) and UEs #6 to #10 can use (or are limited to) a second transmission occasion (here, RO #1, RO #3, RO #5, and RO #7). Here, a case is illustrated in which UEs/UE groups are divided into two, but the UEs/UE groups may be divided into three or more.

Note that the UEs/UE groups may be classified taking account of both the frequency domain and time domain. For example, in FIG. 4B, the first transmission occasion may include RO #0, RO #3, RO #4, and RO #7 and the second transmission occasion may include RO #1, RO #2, RO #5, and RO #6.

Alternatively, the UEs/UE groups may be divided based on another parameter (for example, preamble index domain), or the UEs/UE groups may be divided based on a combination of the preamble index domain and the time domain/frequency domain.

As a method of dividing UEs, at least one of Options 1-1 to 1-3 as below may be employed.

<Option 1-1>

A transmission occasion/preamble index available may be determined based on a UE identifier. For example, the UE identifier, which is sufficient as long as being an index used to identify a UE, may be a UE ID or the like.

Information related to a correspondence relation of a UE identifier and the transmission occasion/preamble index may be prescribed (for example, defined in a specification) in advance, or may be notified/configured for a UE by a network (for example, base station). For example, the base station may include, in system information (for example, MIB/SIB) or an RRC, information related to a transmission occasion/preamble index corresponding to a UE identifier and notify the UE of the information.

<Option 1-2>

A transmission occasion/preamble index available may be determined based on a type/capability of UE. For example, the type/capability of UE may be at least one of a UE type, a UE capability, a UE class, and a category. The UE type may be interpreted as a traffic type, a service type, a communication type.

For example, a transmission occasion/preamble index available may be configured separately for each of a UE for IoT (Internet of Things) and a UE for URLLC/eMBB. In this case, many transmission occasions may be configured for the UE for URLLC/eMBB compared to the UE for IoT (Internet of Things).

Information related to a correspondence relation of the type/capability of UE and the transmission occasion/preamble index may be prescribed (for example, defined in a specification) in advance, or may be notified/configured for a UE by a network (for example, base station). For example, the base station may include, in system information (for example, MIB/SIB) or an RRC, information related to a transmission occasion/preamble index corresponding to a type/capability of UE and notify the UE of the information.

<Option 1-3>

Information related to a transmission occasion/preamble index available for each UE may be notified/configured per terminal by a base station in advance. For example, the base station may notify/configure for each UE the information related to the transmission occasion/preamble index by using higher layer signaling (for example, RRC signalling, RRC release message, and/or the like).

Based on the information notified/configured by the base station, the UE determines a transmission occasion to be used for transmission of a PRACH preamble. Note that, based on configuration information notified last by the base station (or configuration information stored in the UE), the UE in an inactive mode may determine the transmission occasion to be used for transmission of the PRACH preamble.

As described above, in the first aspect, a transmission occasion/preamble index is configured separately per UE/UE group. In an existing system (for example, Rel. 16 or earlier versions), terminals in a cell share a same PRACH transmission occasion. Thus, for example, when there are concentrated with terminals performing access/activation together at the same timing, contention of PRACH transmissions may be highly likely to occur. In contrast, according to the first aspect, even when the number of terminals in a cell increases, a case where contention occurs in a random access procedure (for example, PRACH transmission) can be suppressed.

Second Aspect

In a second aspect, a configuration of a sequence length/subcarrier spacing/slot length of a PRACH preamble will be described.

In an existing system, a value usable as a sequence length of a PRACH preamble is defined in advance, and is limited to some values (for example, 139, 571, 839, 1151, etc) (see FIGS. 2 and 3). In the present embodiment, a sequence length of a PRACH preamble may be configured flexibly.

In an existing system, a correspondence relation of a sequence length and a subcarrier spacing of a PRACH preamble is defined in a fixed manner in advance. In the present embodiment, each of a subcarrier spacing and a sequence length of a PRACH preamble may be configured independently.

As a parameter (for example, sequence length/subcarrier spacing/slot length) of a PRACH preamble, at least one of Options 2-1 to 2-2 as below may be employed.

<Option 2-1>

A value of a sequence length may be notified/configured for a UE by a network (for example, base station). For example, a given value may be configurable for the UE. The given value may be selected from a first range (for example, values from 1 to 839) or selected from a second range (for example, values from 1 to 1151). Alternatively, the given value may be selected from a different range.

All of the values from among the first range/second range/different range may be configurable, or a part of the values from among the range may be configurable. When all of the values are configurable, (1, 2, 3, . . . , 839) etc may be configured, for example. When a part of the values are configurable, (1, 3, 5, 7, 11, 13, . . . ), (71, 139, . . . ), etc may be configured, for example.

When a part of the values are configurable for a sequence length of a PRACH preamble, the part of the values may be notified/configured for the UE, or the part of the values may be associated with a given format and information related to the format may be notified/configured for the UE.

The base station may notify/configure, for the UE, a subcarrier spacing and a sequence length of a PRACH preamble separately. This allows the subcarrier spacing and the sequence length of the PRACH preamble to be configured flexibly.

<Option 2-2>

A configured value of a sequence length may be configured in a given unit. For the given value, a unit of frequency domain may be used. For example, a resource block (RB/PRB/VRB) may be used. In other words, a value of a sequence length is not configured directly, but the number of RBs may be configured and a UE may determine/recognize a sequence length on the basis of the number of RBs configured.

When one RB is configured for a sequence length, the UE may recognize/assume the sequence length in which a preamble frequency resource corresponds to one RB. When six RBs are configured, the UE may recognize/assume the sequence length in which a preamble frequency resource corresponds to six RBs.

Even when the same RB is configured, a case is conceivable in which a sequence length varies depending on a subcarrier spacing (or CP length/guard period etc) of a preamble. Thus, the UE may determine the sequence length taking account of the number of RBs configured and the subcarrier spacing.

A relation of the number of RBs and a sequence length may be prescribed/defined. Alternatively, a relation of the number of RBs, a sequence length, and a subcarrier spacing may be prescribed/defined. Information related to a correspondence relation of the number of RBs and a sequence length (or correspondence relation of the number of RBs, a sequence length, and a subcarrier spacing) may be notified/configured for the UE by the base station.

Frequency multiplexing (for example, FDM) of preamble resources may be configured. When the number of times of frequency multiplexing (FDM) of preamble resources is configured, the UE may recognize/assume a sequence length in which the total amount of FDMed preamble frequency resources is equal to (for less than) the number of RBs configured.

For example, when one RB and two times of FDM are configured, a sequence length may be configured in which the total of FDMed two preamble resources corresponds to one RB (one preamble frequency resource corresponds to 0.5 RBs).

The maximum amount of preamble frequency resources configurable may be prescribed (for example, defined in a specification). Alternatively, information related to the maximum amount of preamble frequency resources configurable may be notified/configured for a UE by a base station.

The maximum amount of preamble frequency resources may be a maximum value with respect to all of the FDMed preamble frequency resources, or may be a maximum value with respect to a single preamble frequency resource. A preamble frequency resource is determined based on a sequence length, a subcarrier spacing, and the number of times of FDM. Thus, a range of values for preamble frequency resources configurable may be determined/controlled taking account of the configured values of a sequence length, a subcarrier spacing, and the number of times of FDM.

In a PRACH preamble in an existing system, the types of sequence lengths available are limited, and a subcarrier spacing (or slot length) configurable for each sequence length is limited. In contrast, as described in the second aspect, a sequence length of a PPACH preamble can be configured flexibly, and each of a subcarrier spacing and a sequence length of the PRACH preamble can be configured independently, so that the PRACH preamble can be configured flexibly. Thus, even when the number of terminals in a cell increases, a case where contention occurs in a random access procedure (for example, PRACH transmission) can be suppressed.

The second aspect may be selectively employed in a specific frequency range (for example, high frequency band/FR2), or may be employed regardless of the frequency range.

Third Aspect

In a third aspect, a case will be described that enables (or supports/allows) associating (or linking) a plurality of synchronization signal blocks (for example, SSBs) with a same preamble index in a same PRACH transmission occasion. The synchronization signal blocks may be interpreted as synchronization signals.

As a configuration of the SSBs/PRACH, at least one of Options 3-1 to 3-2 as below may be employed.

<Option 3-1>

A correspondence relation of a plurality of SSB indices and a PRACH transmission occasion and preamble index may be prescribed (for example, defined in a specification), or may be notified/configured for a UE by a base station. For example, for a given transmission occasion, a common preamble index may be associated with a plurality of SSB indices, and information related to the association may be notified/configured for the UE.

Figures 5A, 5B:
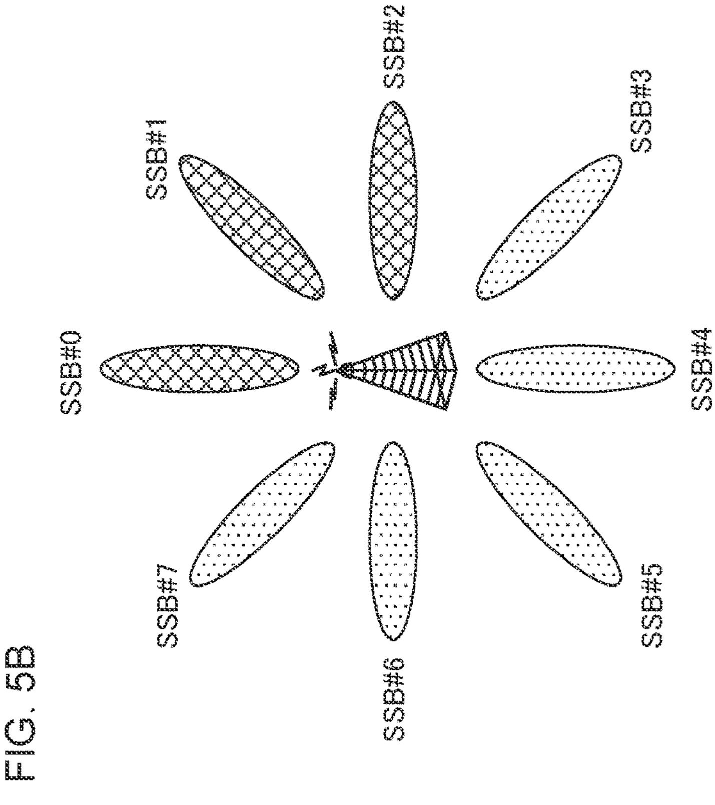
FIGS. 5A and 5B are each a diagram illustrated to describe a correspondence relation of SSBs and PRACH preambles according to a third aspect.

For example, a plurality of SSB indices corresponding to beams (or spatial domain filters, TCI states, QCLs) that can be spatially divided may be associated with a same preamble index in a same transmission occasion (see FIG. 5A). In FIG. 5A, a plurality of SSBs #0, #2, #4, and #6 corresponding to beams #0, #2, #4, and #6, respectively, may correspond to a same preamble index #Y in a same transmission occasion #X.

For example, the base station, when receiving a PRACH preamble (for example, #Y) from the UE in the transmission occasion #X, may determine/distinguish which SSB the preamble corresponds to, and may control a procedure (for example, random access procedure) thereafter. Based on the direction of the PRACH preamble transmitted from the UE (or from which direction a beam of the PRACH preamble is received), the base station may determine/distinguish a given SSB from among the plurality of SSBs corresponding to the same preamble index.

The base station, when receiving a PRACH preamble, may notify the UE of information related to SSBs corresponding to the PRACH preamble. The information related to the SSBs may be included in Message 2, Message 4, Message B, or a DL transmission after Message 4, and notified to the UE.

Alternatively, a plurality of SSB indices corresponding to neighboring beams may be associated with a same preamble index in a same transmission occasion (see FIG. 5B). In FIG. 5B, a plurality of SSB indices #0, #1, and #2 corresponding to beams #0, #1, and #2, respectively, may correspond to a same preamble index #Y in a same transmission occasion #X.

The base station, when receiving the PRACH preamble index #Y, may assume that the UE receives (for example, receives at the maximum received power) any of the SSB indices #0, #1, and #2 and may control a procedure thereafter. This allows the base station/UE to select a beam of good quality even if the beam is not the best beam.

As described above, associating a plurality of SSBs with a same preamble index in a same transmission occasion is supported/allowed, so that, even when the number of SSBs (for example, SSB indices) to be used for communication increases, an increase in the number of SSBs (or transmission occasions corresponding to the SSBs) not to be used can be suppressed. Thus, resources can be used effectively in a random access procedure (for example, PRACH transmission).

<Option 3-2>

SSBs of a same index may be transmitted a plurality of times in a given period (for example, one cycle of SSB).

Figure 6:
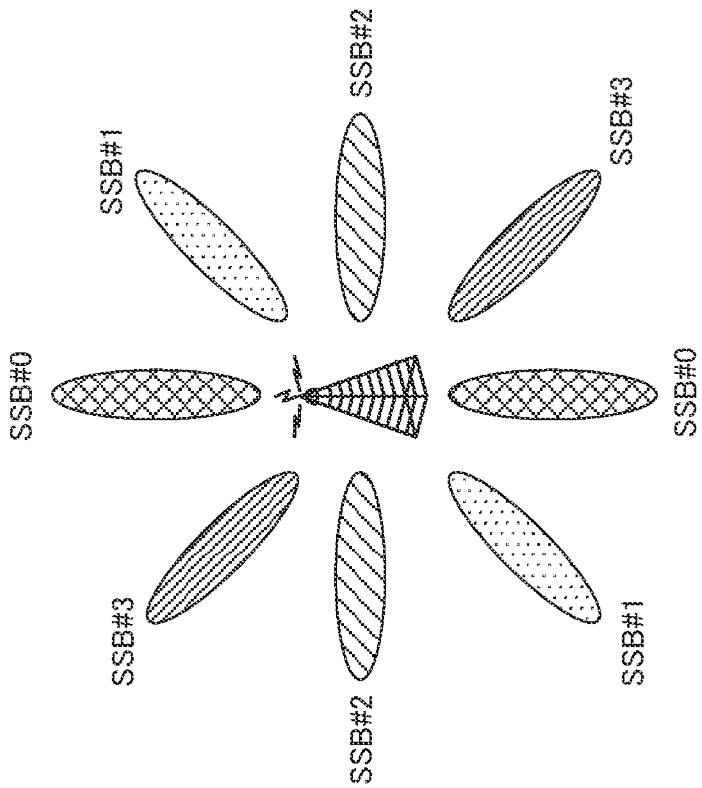
FIG. 6 is a diagram illustrated to describe a correspondence relation of SSBs and PRACH preambles according to the third aspect.

In this case, a plurality of signals (including SSBs of a same index) transmitted in the same cycle configured for the SSBs may be transmitted in different beams (see FIG. 6). FIG. 6 illustrates a case where SSBs #0 to #3 are each transmitted twice in different time domains in a given period (for example, the same cycle). The number of times of transmission of a same SSB, a range of SSBs, and an order of SSBs to be transmitted are not limited to this.

FIG. 6 illustrates a case where a different beam is used for each of a set of the SSBs #0, a set of the SSBs #1, a set of the SSBs #2, and a set of the SSBs #3.

In this case, only one SSB index may be associated with a same preamble in a same transmission occasion for a PRACH preamble. For example, an SSB #0 and an SSB #1 may be associated with a given transmission occasion, and a different preamble index may be associated with each of the SSB #0 and the SSB #1.

When one SSB index is transmitted a plurality of times in different beams, an SSB #0 associated with a given preamble index includes a plurality of SSBs #0 transmitted in different beams. Thus, similarly to Option 3-1, an SSB using different beams (a plurality of SSBs of the same index) can be associated with a same transmission occasion/same preamble index. Thus, even when the number of SSBs (for example, SSB indices) to be used for communication increases, an increase in the number of SSBs (or transmission occasions corresponding to the SSBs) not to be used can be suppressed.

Information (for example, resource position/the number of times of transmission/cycle and the like of SSB) related to a synchronization signal/SSB to be transmitted a plurality of times may be prescribed (for example, defined in a specification) in advance, or may be notified/configured for the UE by the base station. A notification from the base station to the UE may use system information (for example, MIB/SIB) or an RRC.

Note that, in Option 3-1/3-2, when a preamble transmission in a given transmission occasion corresponding to different SSBs is distinguishable at the base station side, information (for example, information about SSB index/SSB resource position and the like) related to SSBs corresponding to the PRACH preamble received by the base station may be notified to the UE. The information related to the SSBs may be included in at least one of a random access response (RAR), a PDCCH, and RMSI. The information related to the SSBs may be index information for all the SSBs, or may be index information among SSBs sharing a same preamble index of a same transmission occasion.

In an existing system, only one SSB index can be associated with a same preamble index in a same transmission occasion. In contrast, the present embodiment supports/allows associating a plurality of SSB indices (or SSBs with the same index but different beams) with a same preamble index in a same transmission occasion. Thus, even when the number of SSBs increases, an increase in the number of SSBs (or transmission occasions corresponding to the SSBs) not to be used can be suppressed.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
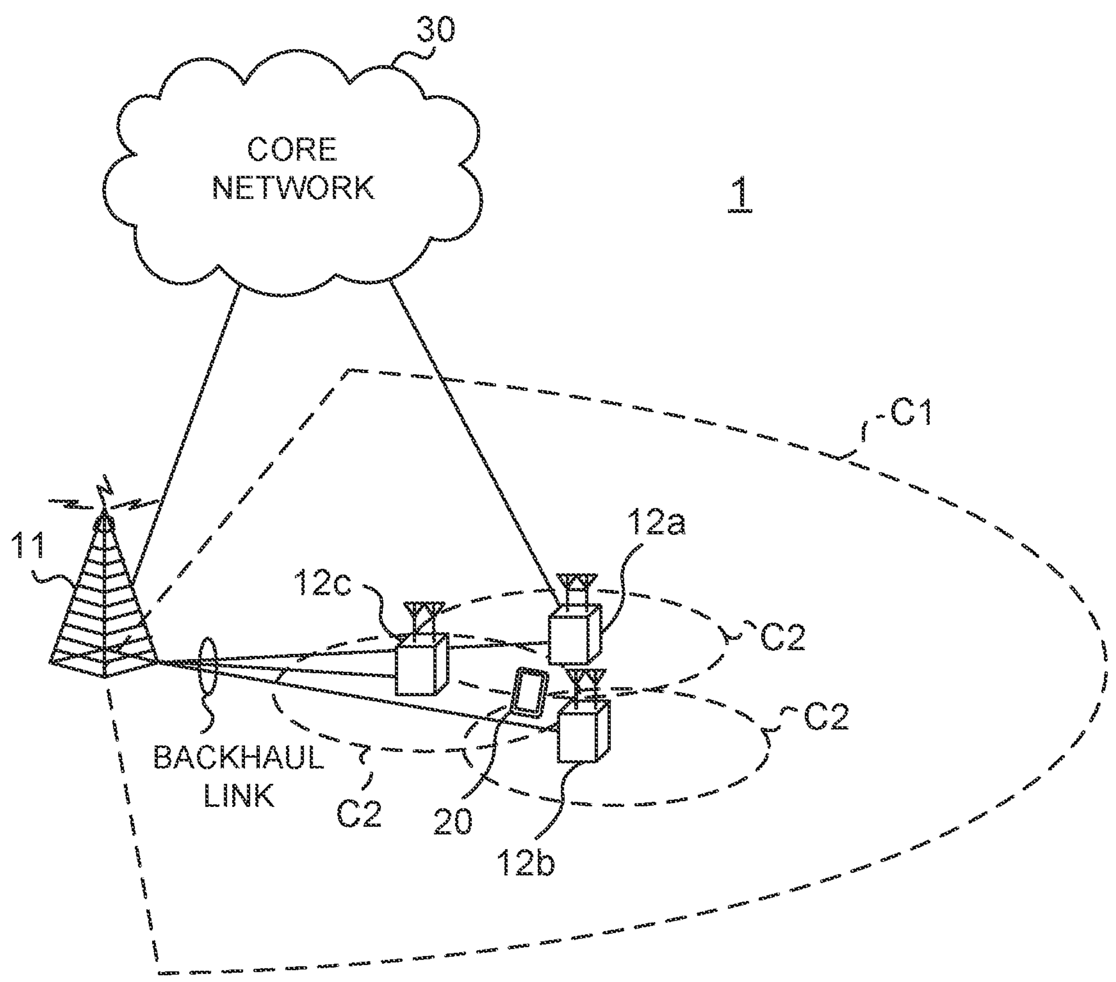
FIG. 7 is a diagram to illustrate an example of a schematic structure of a radio communication system according to one embodiment.

FIG. 7 is a diagram to illustrate an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect illustrated in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
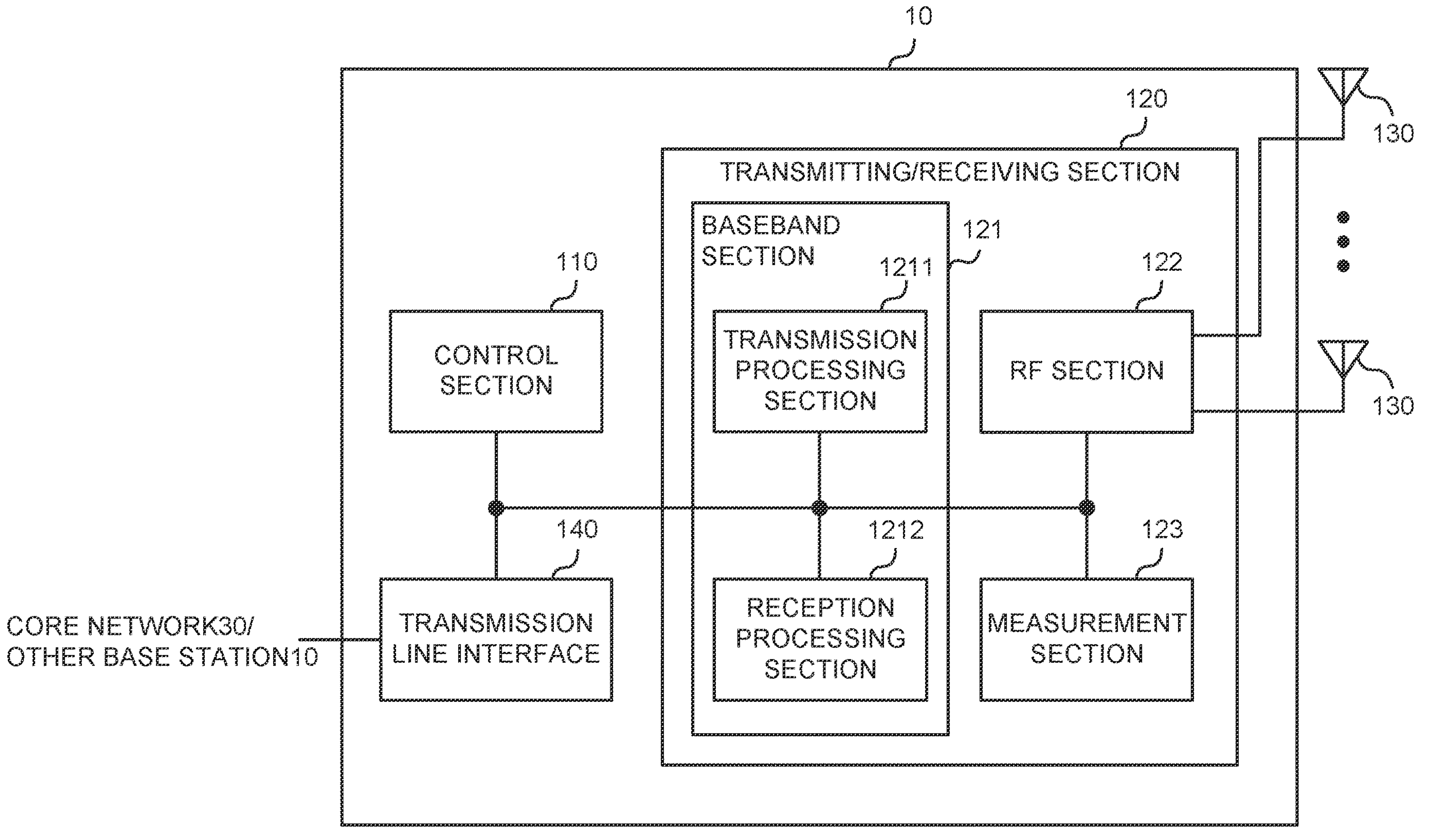
FIG. 8 is a diagram to illustrate an example of a structure of a base station according to one embodiment.

FIG. 8 is a diagram to illustrate an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily illustrates functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may receive a random access preamble.

The control section 110 may determine, based on at least one of terminal identification information, a terminal type, terminal capability information, and information notified to a terminal, at least one of a transmission occasion and an index that are to be used for transmission of a random access preamble from the terminal.

(User Terminal)

Figure 9:
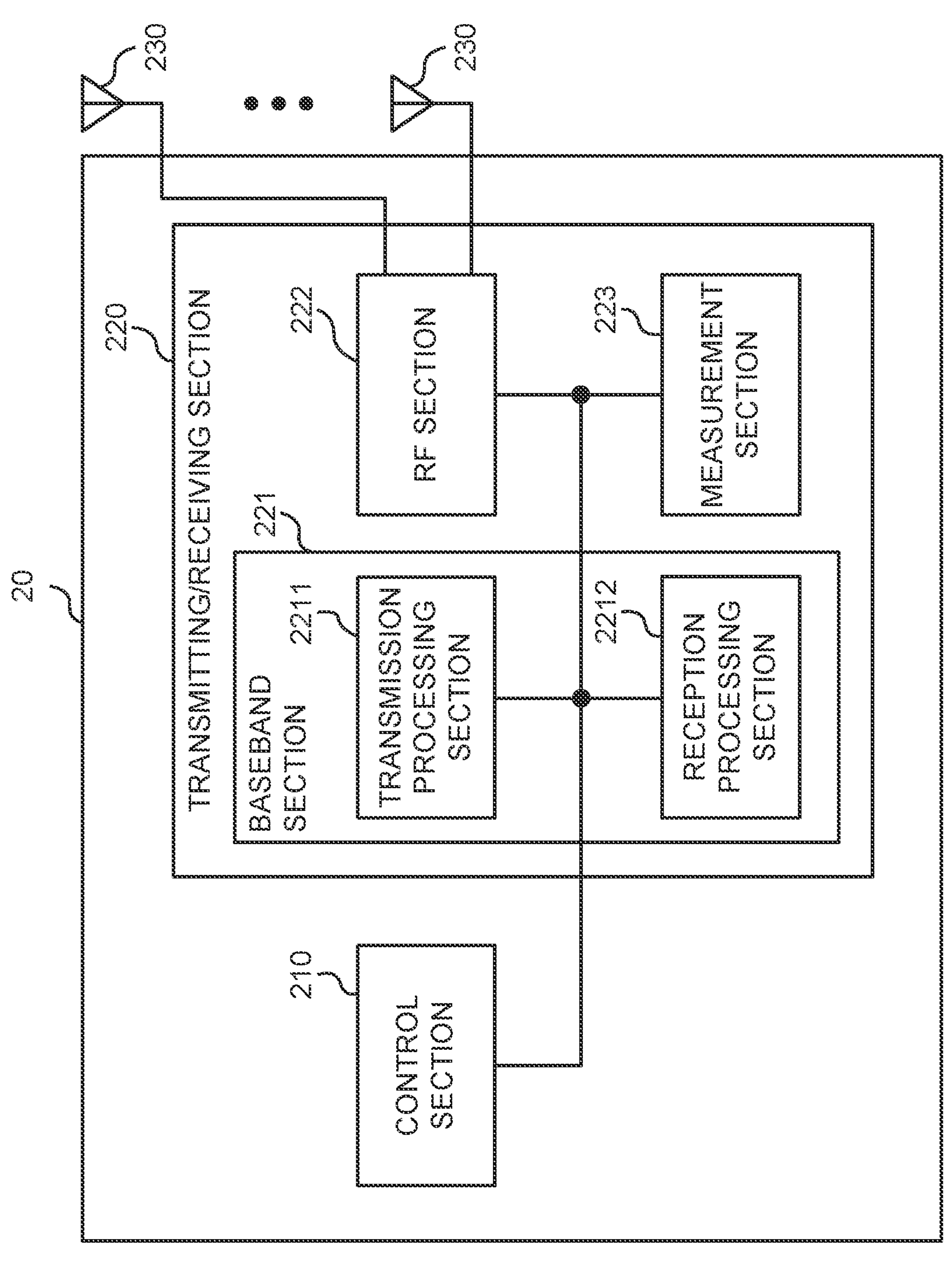
FIG. 9 is a diagram to illustrate an example of a structure of a user terminal according to one embodiment.

FIG. 9 is a diagram to illustrate an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily illustrates functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may transmit a random access preamble. The transmitting/receiving section 220 may receive information related to a synchronization signal block corresponding to the random access preamble transmitted.

The control section 210 may determine, based on at least one of terminal identification information, a terminal type, terminal capability information, and information notified from a base station, at least one of a transmission occasion and an index that are available for transmission of a random access preamble.

A subcarrier spacing and a sequence length may be configured separately for the random access preamble. When a plurality of synchronization signal blocks are associated with a transmission occasion for the random access preamble, associating a same random access preamble index with the plurality of synchronization signal blocks may be supported.

(Hardware Structure)

Note that the block diagrams that have been used to describe the above embodiments illustrate blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
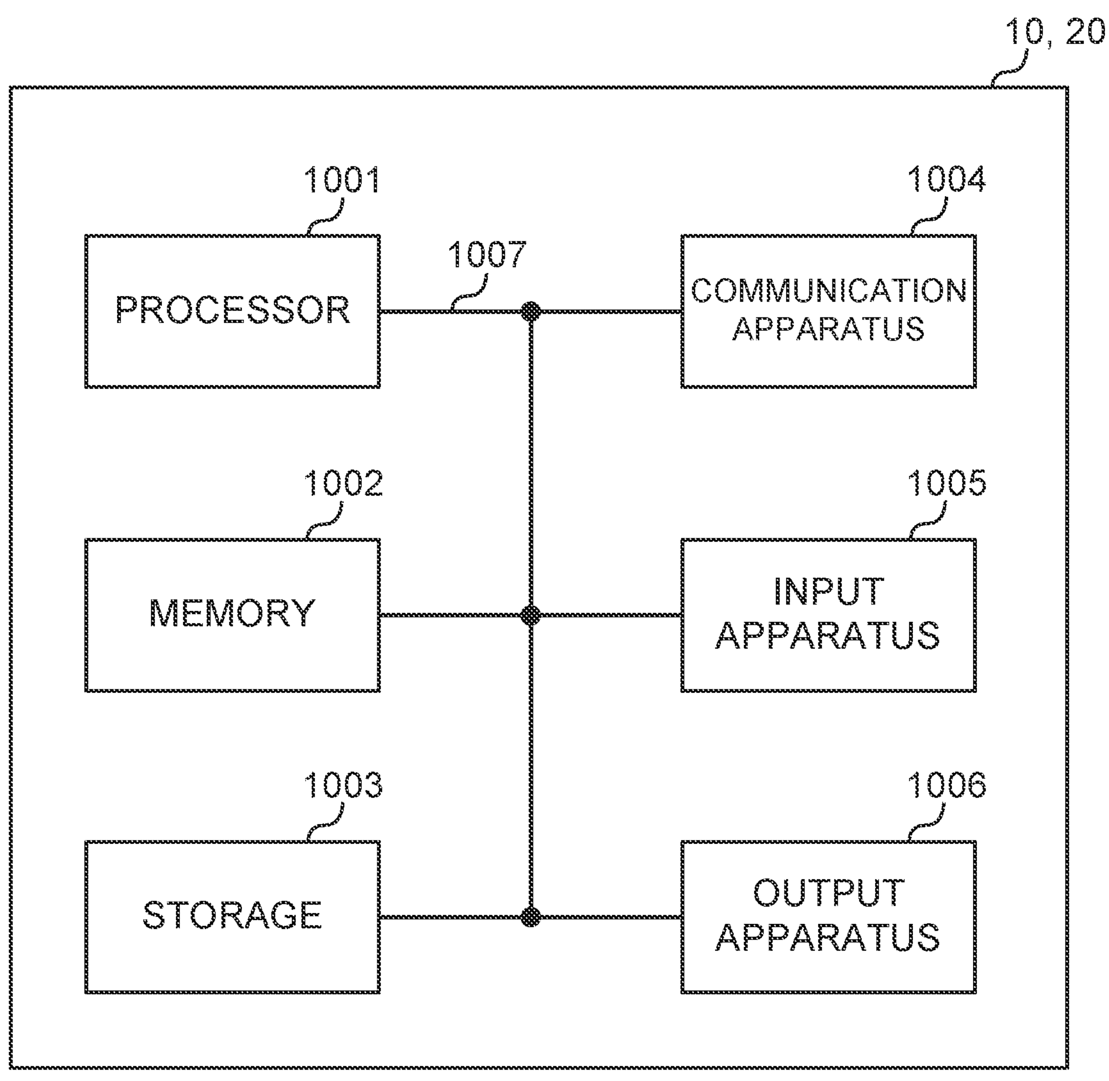
FIG. 10 is a diagram to illustrate an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to illustrate an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses illustrated in the drawings, or may be configured not to include part of apparatuses.

For example, although only one processor 1001 is illustrated, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of given information (for example, notification of "being X") does not necessarily have to be notified explicitly, and can be notified implicitly (by, for example, not notifying this given information or notifying another information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U3 MB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a processor that determines, based on at least one of terminal identification information, a terminal type, terminal capability information, and information notified from a base station, at least one of a transmission occasion and an index that are available for transmission of a random access preamble; and a transmitter that transmits the random access preamble, wherein a subcarrier spacing and a sequence length are configured separately for the random access preamble, and wherein when frequency-multiplexed preamble resources are configured, the processor assumes the sequence length is less than or equal to a total number of resource blocks of the frequency-multiplexed preamble resources.

2. The terminal according to claim 1, wherein when a plurality of synchronization signal blocks are associated with a transmission occasion for the random access preamble, associating a same random access preamble index with the plurality of synchronization signal blocks is supported.

3. The terminal according to claim 1, further comprising:

a receiver that receives information related to a synchronization signal block corresponding to the random access preamble transmitted.

4. A radio communication method in a terminal, the radio communication method comprising:

determining, based on at least one of terminal identification information, a terminal type, terminal capability information, and information notified from a base station, at least one of a transmission occasion and an index that are available for transmission of a random access preamble; and transmitting the random access preamble, wherein a subcarrier spacing and a sequence length are configured separately for the random access preamble, and wherein when frequency-multiplexed preamble resources are configured, the terminal assumes the sequence length is less than or equal to a total number of resource blocks of the frequency-multiplexed preamble resources.

5. A base station for a terminal, the base station comprising:

processor that determines, based on at least one of terminal identification information, a terminal type, terminal capability information, and information notified to a terminal, at least one of a transmission occasion and an index that are to be used for transmission of a random access preamble from each of terminals; and a receiver that receives the random access preamble, wherein a subcarrier spacing and a sequence length are configured separately for the random access preamble, and wherein when the processor configures frequency-multiplexed preamble resources, the terminal assumes the sequence length is less than or equal to a total number of resource blocks of the frequency-multiplexed preamble resources.

* * * * *